United States Patent [19]
Yoshida et al.

[11] Patent Number: 5,640,750
[45] Date of Patent: Jun. 24, 1997

[54] METHOD OF AND APPARATUS FOR ASSEMBLING WHEELS TO VEHICLES

[75] Inventors: Norio Yoshida; Hideki Fujiwara; Isamu Tomosue, all of Hiroshima-ken, Japan

[73] Assignee: Mazda Motor Corporation, Hiroshima, Japan

[21] Appl. No.: 269,586

[22] Filed: Jul. 1, 1994

[30] Foreign Application Priority Data

Jul. 2, 1993 [JP] Japan ................................. 5-164778
Jun. 14, 1994 [JP] Japan ................................. 6-132010

[51] Int. Cl.$^6$ ................................. B23P 11/02
[52] U.S. Cl. ................. 29/525.02; 29/281.5; 29/464; 29/787; 901/7
[58] Field of Search ................. 29/525.02, 407.1, 29/407.04, 464, 787, 281.5; 414/426; 901/7, 41

[56] References Cited

FOREIGN PATENT DOCUMENTS

| | | | |
|---|---|---|---|
| 288744 | 11/1988 | European Pat. Off. | 901/41 |
| 62-88535 | 4/1987 | Japan | 901/7 |
| 4-80777 | 12/1992 | Japan. | |

*Primary Examiner*—P. W. Echols
*Attorney, Agent, or Firm*—Keck, Mahin & Cate

[57] ABSTRACT

A wheel assembling apparatus for assembling different types of wheels to different types of vehicle bodies conveyed along a vehicle assembling line has a robot hand for fastening a plurality of nuts to hub bolts provisionally affixed to the wheel so as to assemble the wheel held by the robot hand to the vehicle body. The robot hand is provided with a center pin attachment to which different types of center pins, having been prepared correspondingly to center holes of the different types of wheels, are selectively and detachably attached. The center pin attached to the robot hand is fitted into the center hole of the wheel hub and locates the wheel in position with respect to the robot hand.

15 Claims, 17 Drawing Sheets

METHOD OF AND APPARATUS FOR ASSEMBLING WHEELS TO VEHICLES

BACKGROUND OF THE INVENTION

1. Field of the Invention

The present invention relates generally to a method and an apparatus for assembling automobiles and, more particularly, to a method and an apparatus for assembling a wheel to a vehicle body.

2. Description of Related Art

Conventionally, in vehicle assembling lines, a wheel assembling apparatus is used to adjust angular positions of hub bolts with respect to bolt holes of the wheel hub, insert the hub bolts into the bolt holes and fasten nuts to the hub bolts all at once so as to assemble a wheel to a vehicle body. Such an automatic wheel assembling apparatus is known from, for instance, Japanese Patent Publication No. 4-80,777.

If such a vehicle assembling line is adapted to assemble different types of vehicles, the automatic wheel assembling apparatuses have to handle different types of wheels corresponding to the different types of vehicles. However, because bolt holes of the wheel hubs are different in angular position according to type, the conventional automatic wheel assembling apparatus is not readily adaptable to vehicle assembling lines in which different types of vehicles are assembled.

An automatic wheel assembling apparatus, such as a robot hand, is apt to change its controlled position due, for example, to aging. It is necessary, therefore, to confirm the accuracy of position control of the robot hand at a proper time. The accuracy of position control of the robot hand depends upon the setting of a work origin.

SUMMARY OF THE INVENTION

It is an object of the present invention to provide a method of and an apparatus for positioning and assembling accurately different types of wheels with respect to correspondingly different types of vehicle bodies.

Another object of the present invention is to provide a wheel assembling apparatus cooperating with a robot hand having a controlled position which is accurately guaranteed.

These objects of the present invention are achieved by providing a particular wheel assembling apparatus for assembling different types of wheels to different types of vehicle bodies conveyed along a vehicle assembling line. The wheel assembling apparatus has a robot hand for fastening a plurality of nuts to hub bolts provisionally affixed to the wheel, thereby assembling the wheel held by the robot hand to the vehicle body. The robot hand is provided with a center pin attachment to which different types of center pins, which have been prepared correspondingly to center holes of the different types of wheels, are selectively and detachably attached. The center pin attached to the robot hand is fitted into the center hole of the wheel hub and locates the wheel in position with respect to the robot hand. The center pin attachment includes a socket for receiving any one of the different types of center pins and a spherical bearing for supporting the socket so as to allow it to cause two dimensional movement with respect to the center pin attachment during the fitting of the center pin. The socket is locked with respect to the center pin attachment during assembling of the wheel to the vehicle body.

Attaching selectively the different types of center pins to the robot hand enables the wheel assembling apparatus to position accurately any type of wheel with respect to the corresponding types of vehicles and assemble them automatically.

Specifically, the different types of center pins are supported by a center pin support device from which a selected one of the center pins is picked up by the robot hand. The center pin support device includes a slide table for supporting the different types of center pins mounted on center pin stands disposed on the slide table. A device cooperates with each center pin stand to engage the center pin with and disengage the center pin from the center pin stand. The wheel assembling apparatus includes a plurality of nut runners arranged around the center pin attachment for fastening the nuts to the hub bolts previously affixed to the wheel hub.

The robot hand, with a pair of fingers, comprises a first member which is movable in one direction so as to regulate a distance between the fingers and a second member secured to the first member which is movable in another direction perpendicular to the one direction. Consequently, the robot hand is adapted to grip any type of wheel firmly and stably.

The wheel assembling apparatus cooperates with a position guarantee device for setting a work origin of the robot hand. The position guarantee device includes a master work for verifying a position of the wheel with respect to the robot hand. This master work includes a stationary base table and a slide table supported for slide movement in two dimensions by the stationary base table. The slide table is provided with a first joining member secured thereto through an interim hub member which is engaged with the robot hand and a second joining member which is engaged with a reference table at a reference point for providing a work origin when the master work is placed on the reference table. Two dimensional displacement of the slide table with respect to the stationary table is detected by gauging means, such as a pair of dial gauges, fixedly provided on the stationary table.

When detaching the first joining member from the slide table and attaching the interim hub member to an axle of the vehicle body, the axle of the vehicle body is accurately detected.

BRIEF DESCRIPTION OF THE DRAWINGS

The above and other objects and features of the present invention will be clearly understood from the following description of a preferred embodiment thereof when considered in conjunction with the accompanying drawings, in which.

DESCRIPTION OF THE PREFERRED EMBODIMENT

Figure 1:
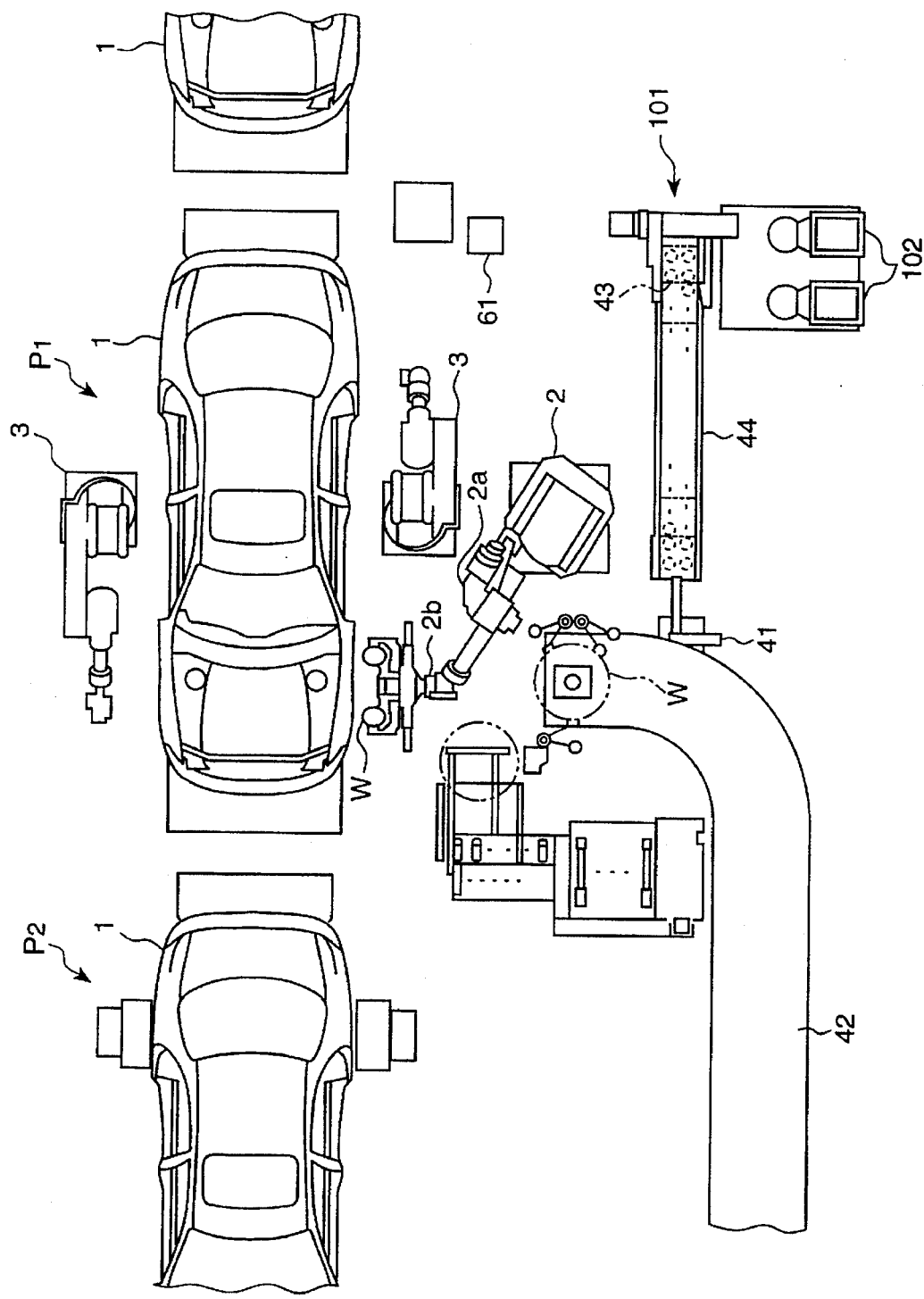
FIG. 1 is a schematic plan illustration showing a part of a vehicle assembling line.
Figure 2:
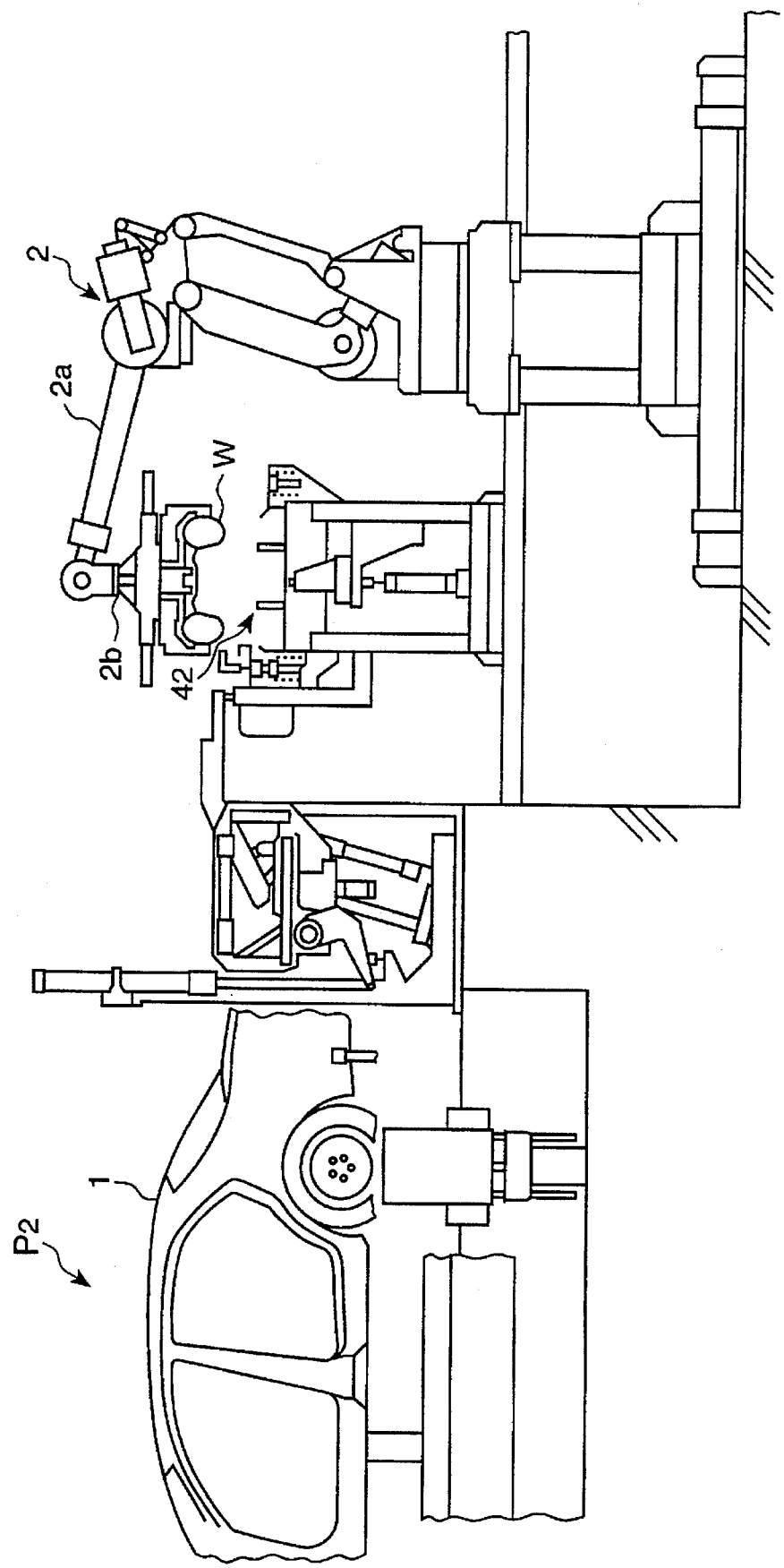
FIG. 2 is a schematic frontal illustration showing the part of the vehicle assembling line including a wheel assembling apparatus in accordance with a preferred embodiment of the present invention.
Figure 3:
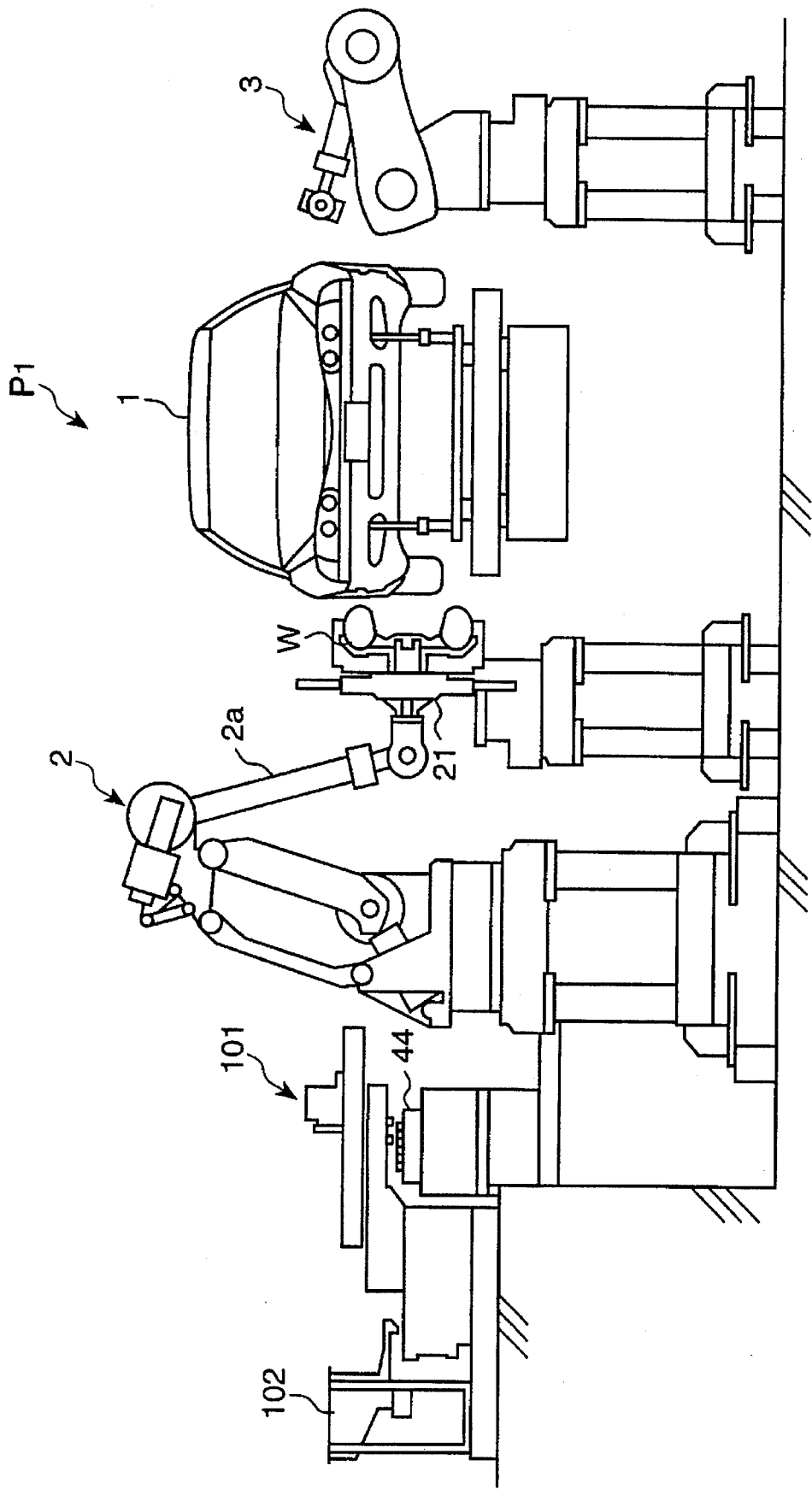
FIG. 3 is a schematic side illustration showing the part of the vehicle assembling line.
Figure 4:
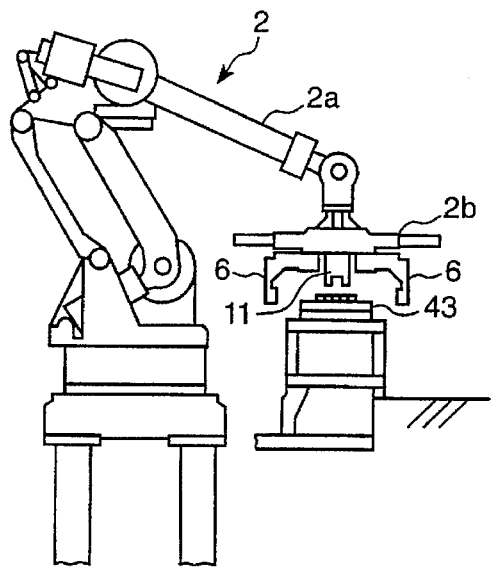
FIG. 4 is a schematic front view of a wheel assembling robot forming part of the wheel assembling apparatus of the present invention.
Figure 5:
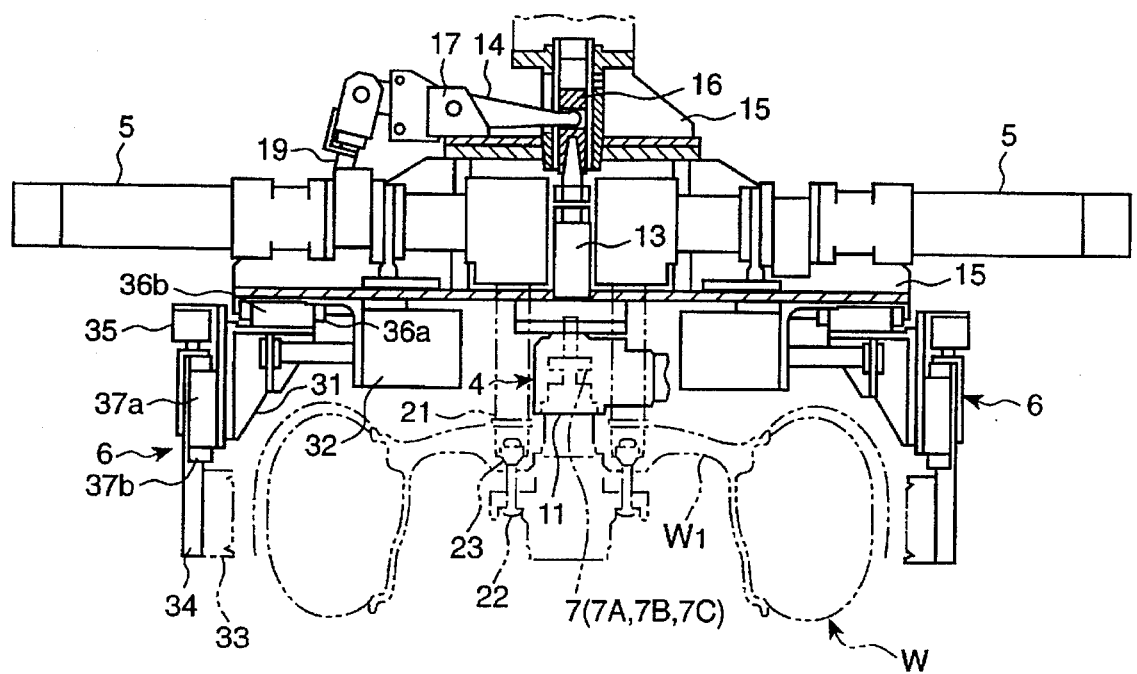
FIG. 5 is a sectional view showing details of a robot hand.

Because various groups of wheel assembling robots or manipulators are disposed symmetrically on both sides of an assembling line, the present description will be directed in particular to a group of wheel assembling robots for assembling a front left wheel to a vehicle body.

Referring now to the drawings in detail and, in particular, to FIGS. 1 to 4, a wheel assembling apparatus 2 in accordance with a preferred embodiment of the present invention is shown disposed at a wheel assembling station P1 in the assembling line L where a wheel and tire assembly W (which is hereafter referred to as a wheel for simplicity) is assembled to a vehicle body 1. The wheel assembling apparatus 2 cooperates with a monitor 3, a center pin stocker 41, and a position guaranty apparatus 61. The vehicle body 1 with wheels W secured thereto is transferred to an inspection station P2 where it is visually inspected and it is determined whether the wheels W are properly assembled to the vehicle body 1. At the wheel assembling station P1, the monitor 3, disposed beside the wheel assembling apparatus 2, monitors the vehicle body 1, specifically, an axle hub of the vehicle 1 to which the wheel W is fitted and assembled by the wheel assembling apparatus 2. The wheel assembling apparatus 2 includes a link mechanism 2a and a manipulator or robot hand 2b at the end of the link mechanism 2a. As will be described in detail in conjunction with FIGS. 5 to 8, the robot hand 2b has a center pin attachment 4 to which different types of hollow center pins 7, for instance three hollow center pins 7A, 7B and 7C, are detachably mounted. The hollow center pin 7 is fitted in a center hole of a wheel hub W1 of the wheel W and used to position the wheel W with respect to the wheel assembling apparatus 2. The robot hand 2b is provided with a plurality of nut runners 5 disposed around the center pin attachment 4 and a wheel hold device 6.

Figure 6:
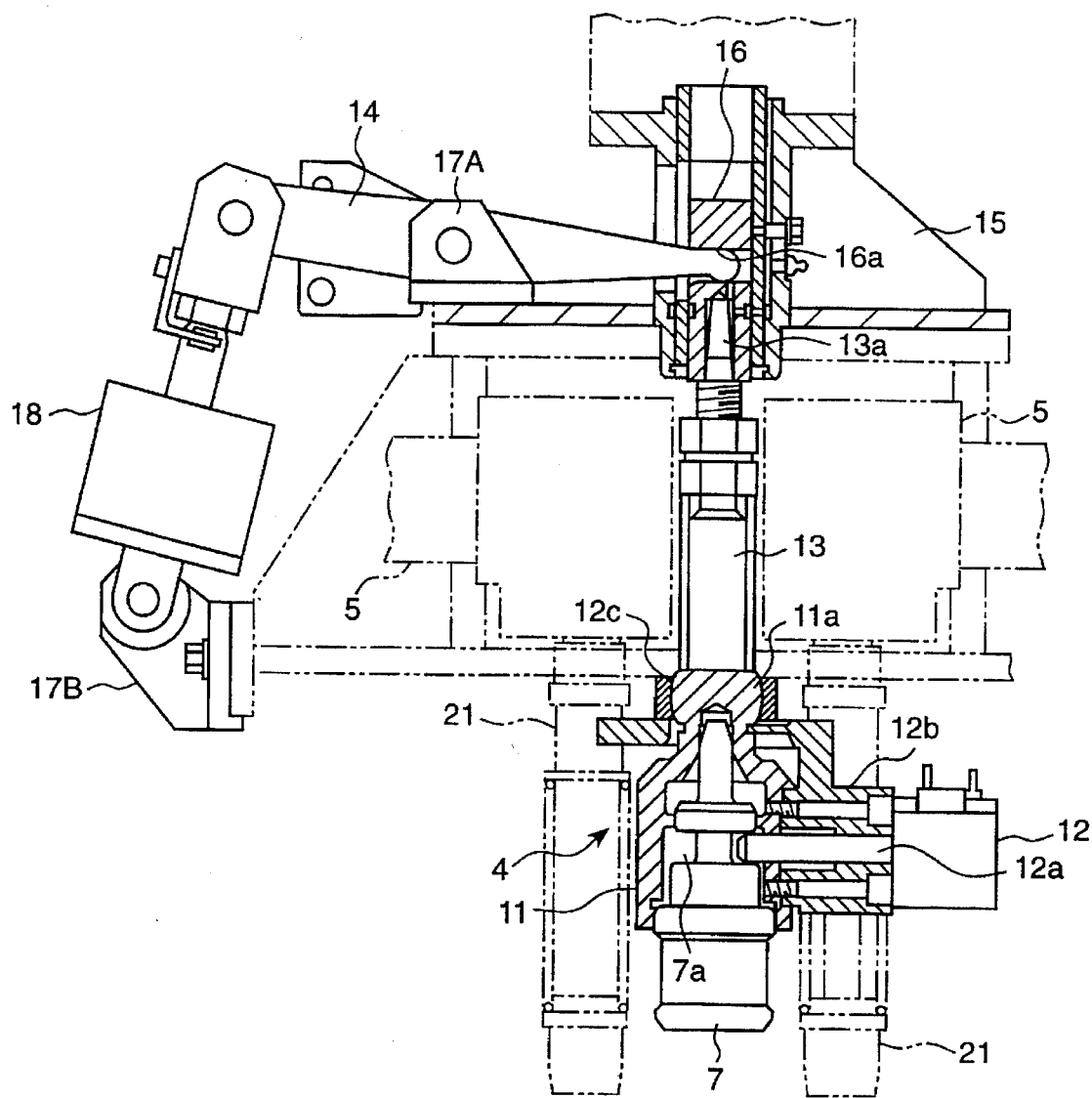
FIG. 6 is a sectional view showing details of a center pin attachment of the robot hand.
Figure 7:
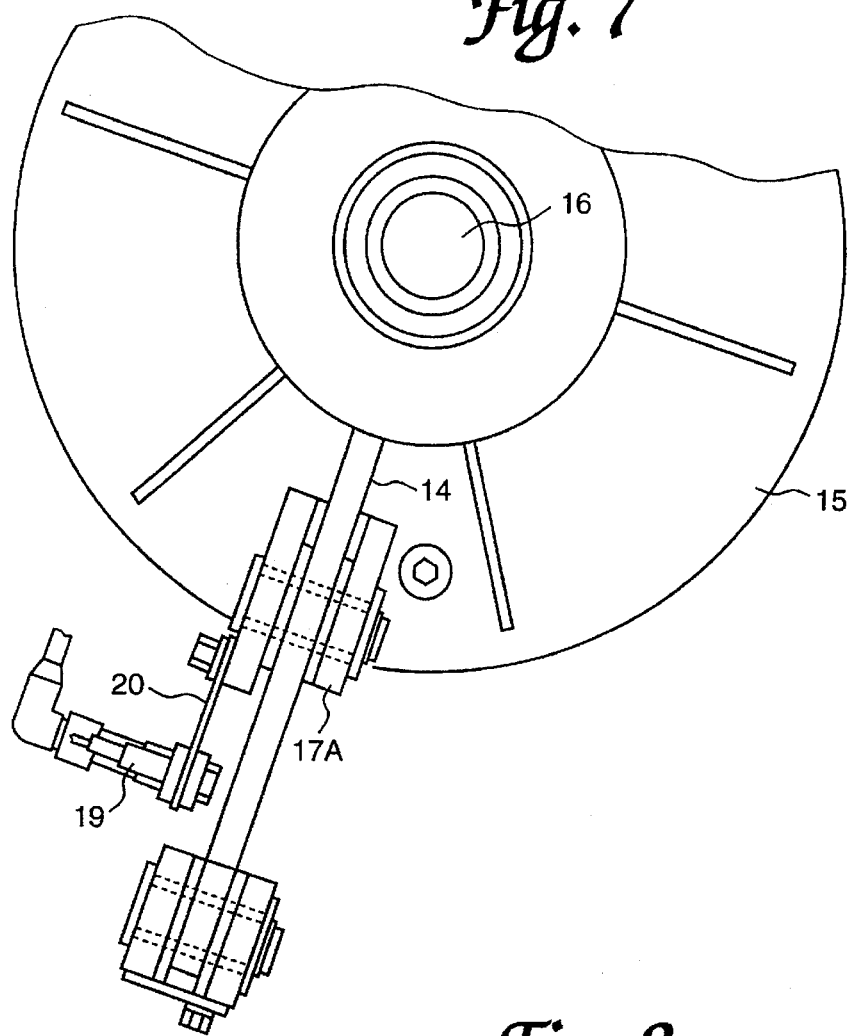
FIG. 7 is a plan view of a part of the robot hand.
Figure 8:
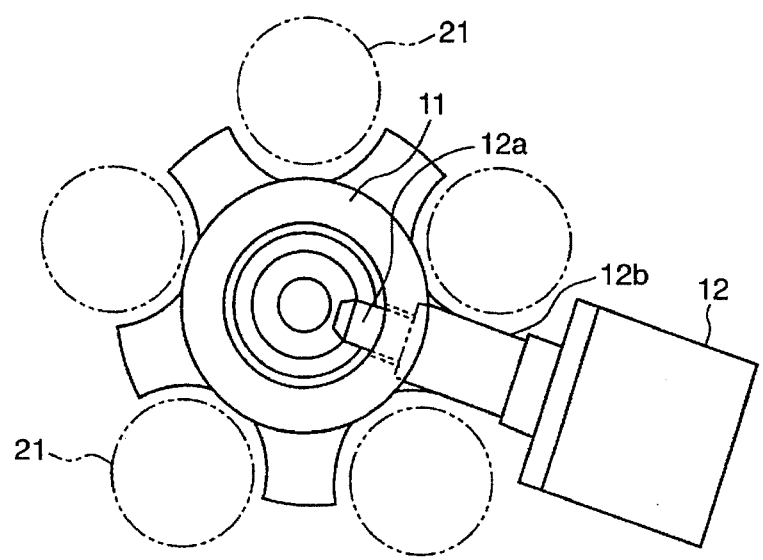
FIG. 8 is a plan view of the essential part of the center pin attachment.
Figure 9:
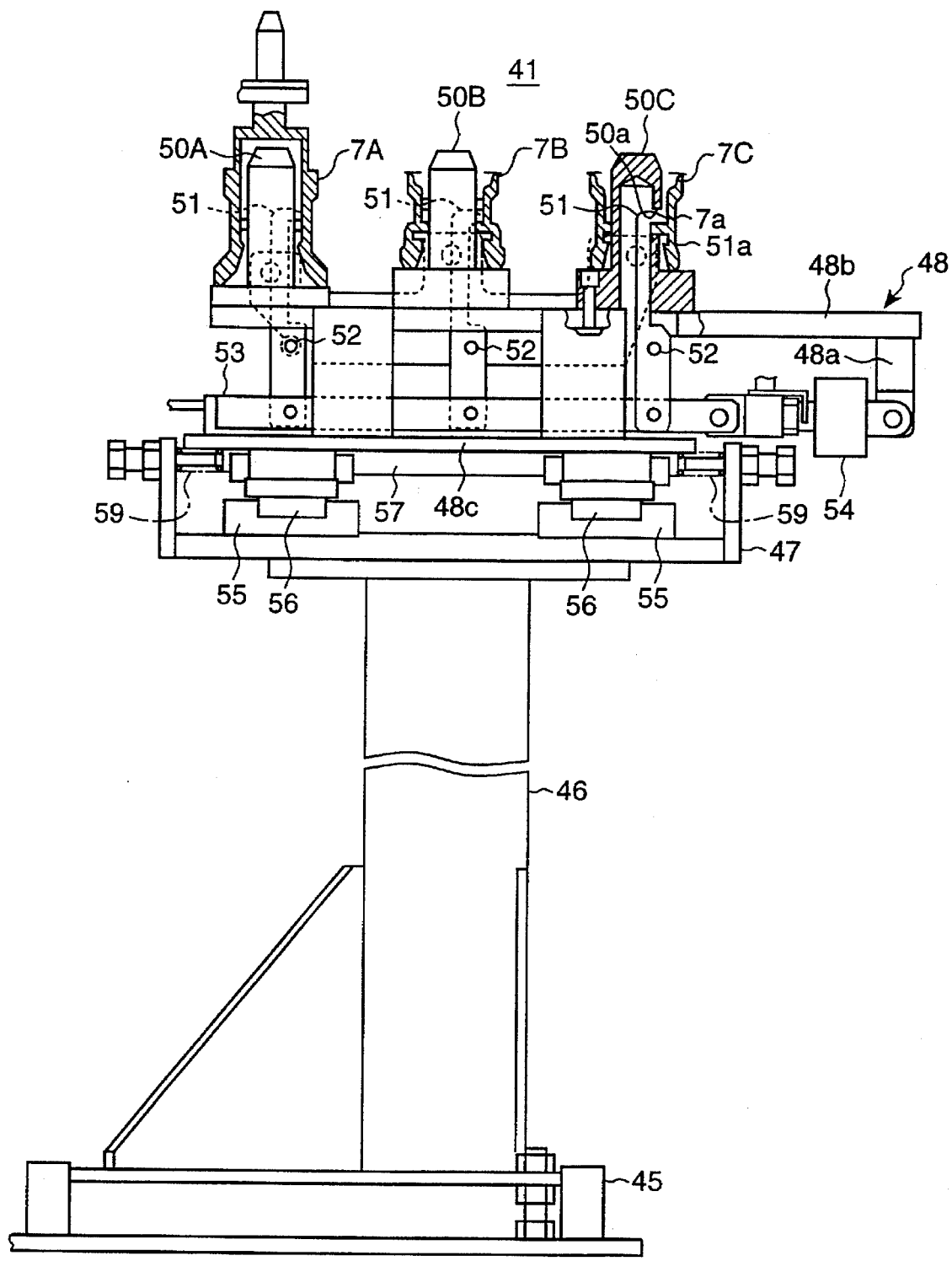
FIG. 9 is a front view of a center pin stocker.
Figure 10:
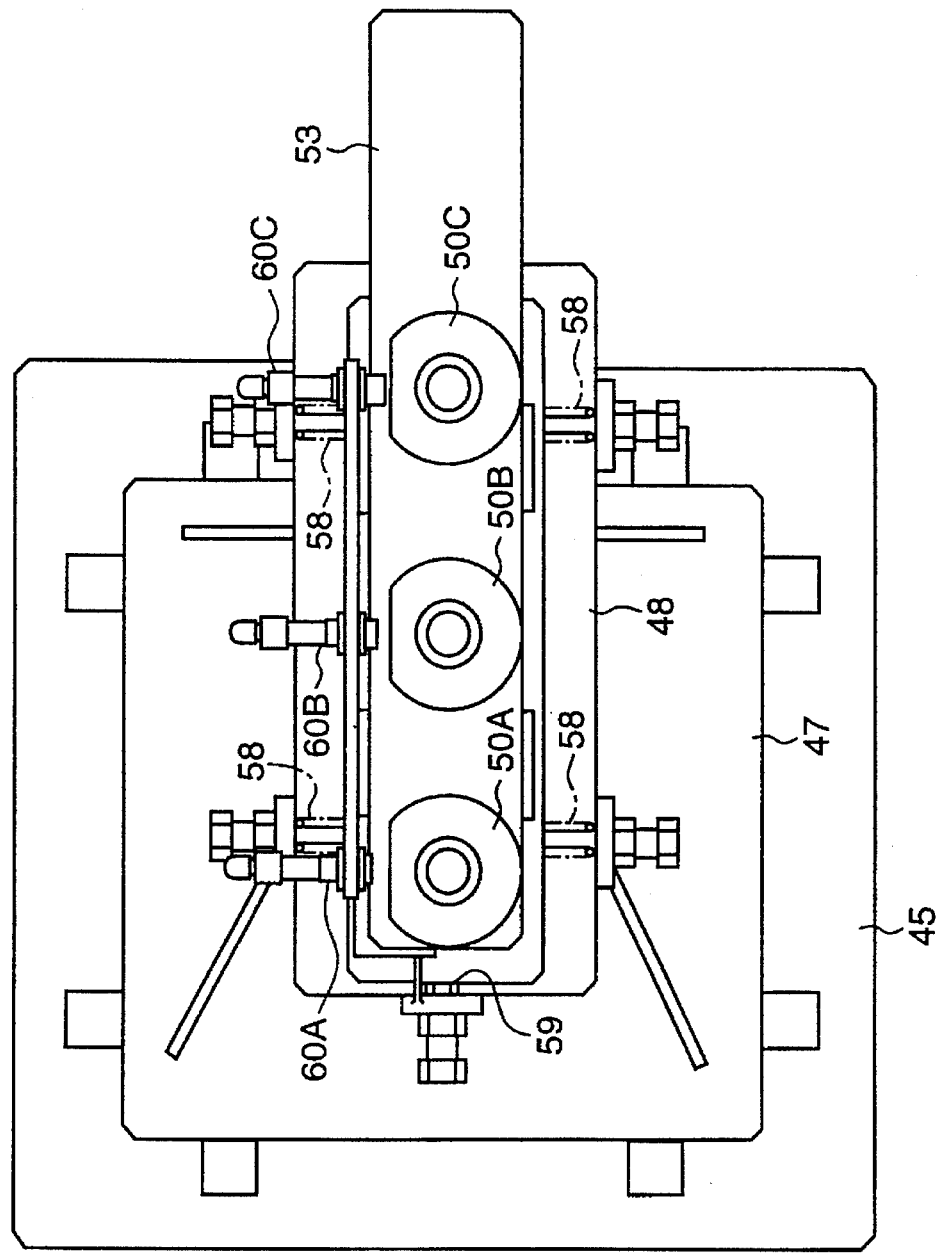
FIG. 10 is a plan view of the center pin stocker.
Figure 11:
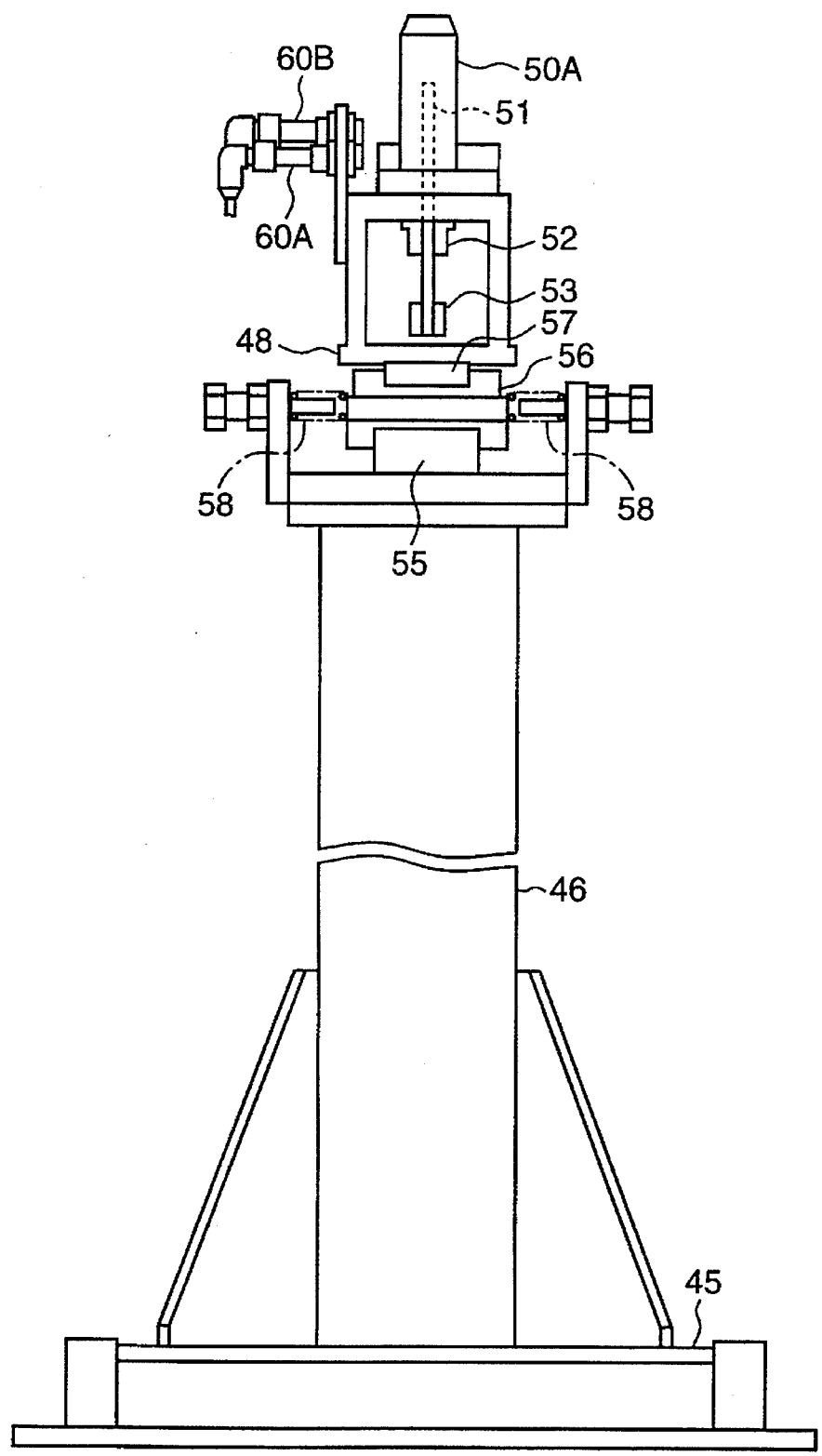
FIG. 11 is a side view of the center pin stocker.
Figure 12:
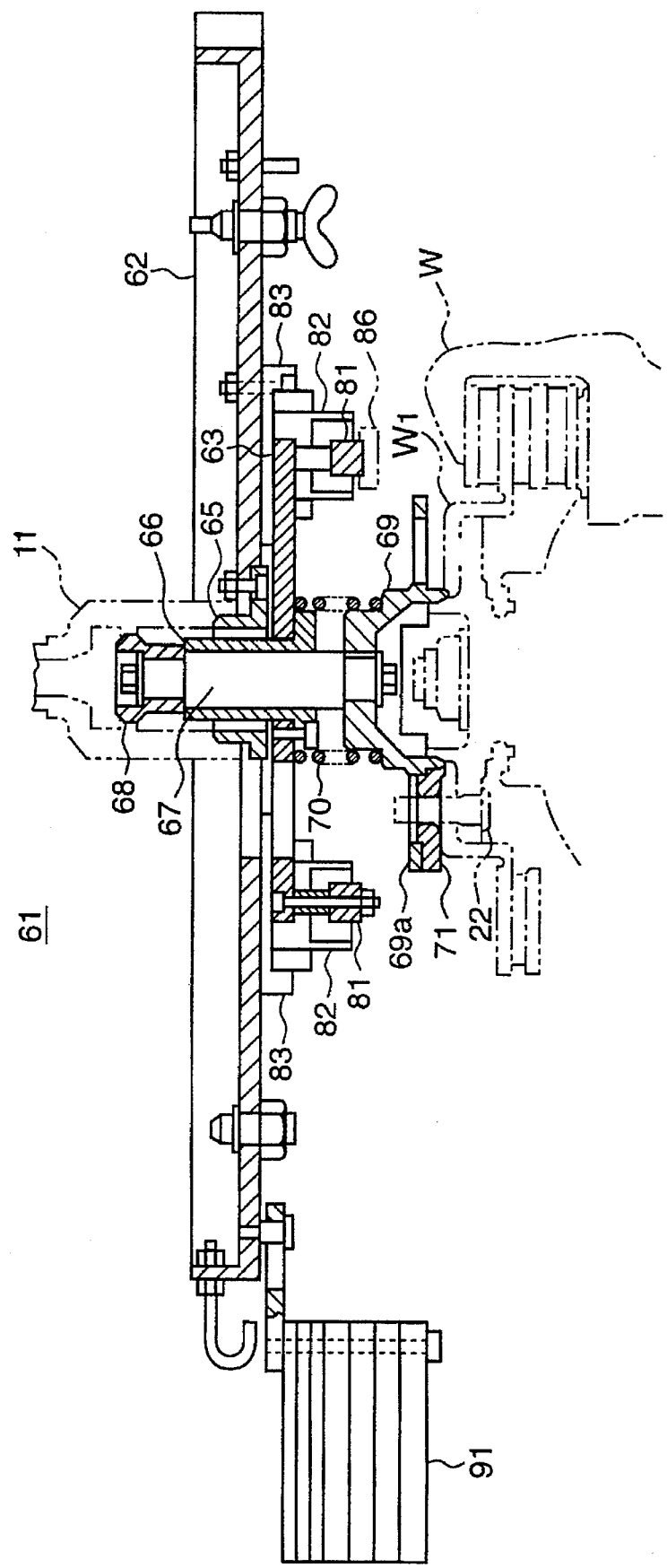
FIG. 12 is a schematic cross-sectional view of a master work.
Figure 13:
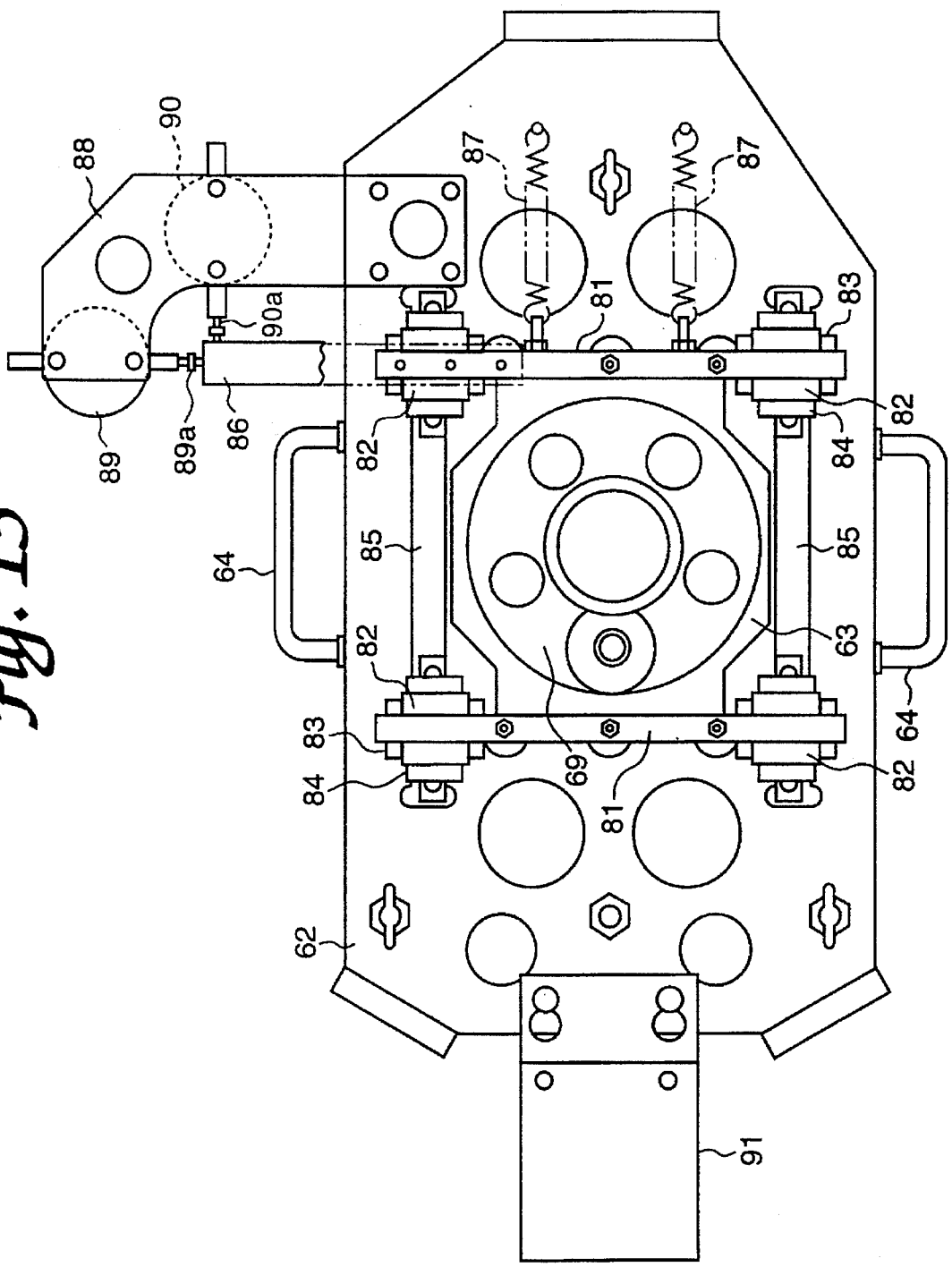
FIG. 13 is a bottom view of the master work.
Figure 14:
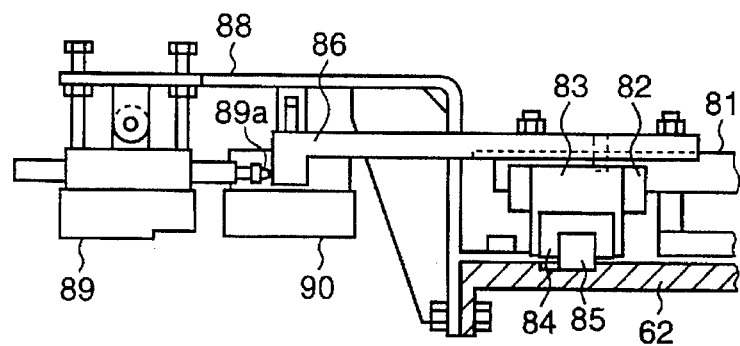
FIG. 14 is an illustration of a part of the master work at which gauges are provided.
Figure 15:
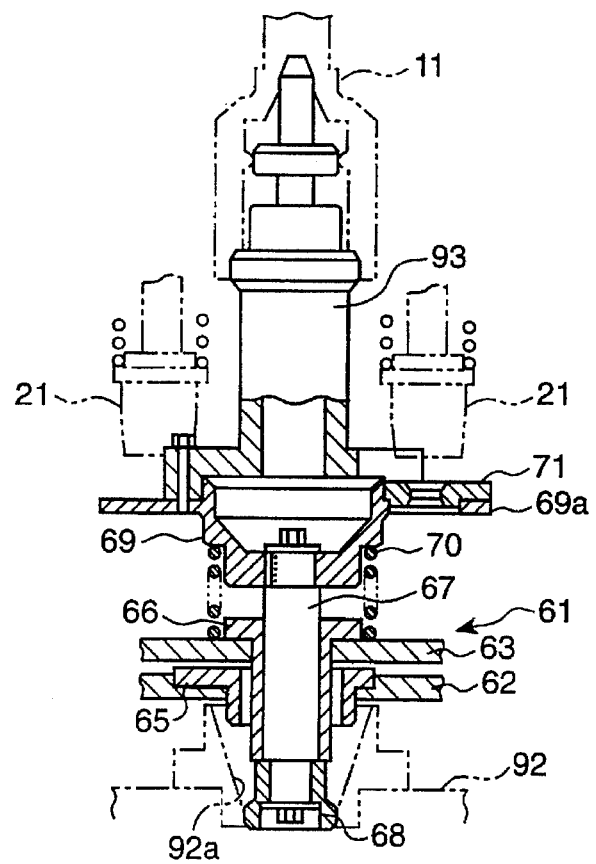
FIG. 15 is an explanatory illustration of work origin setting of the master work.
Figure 16:
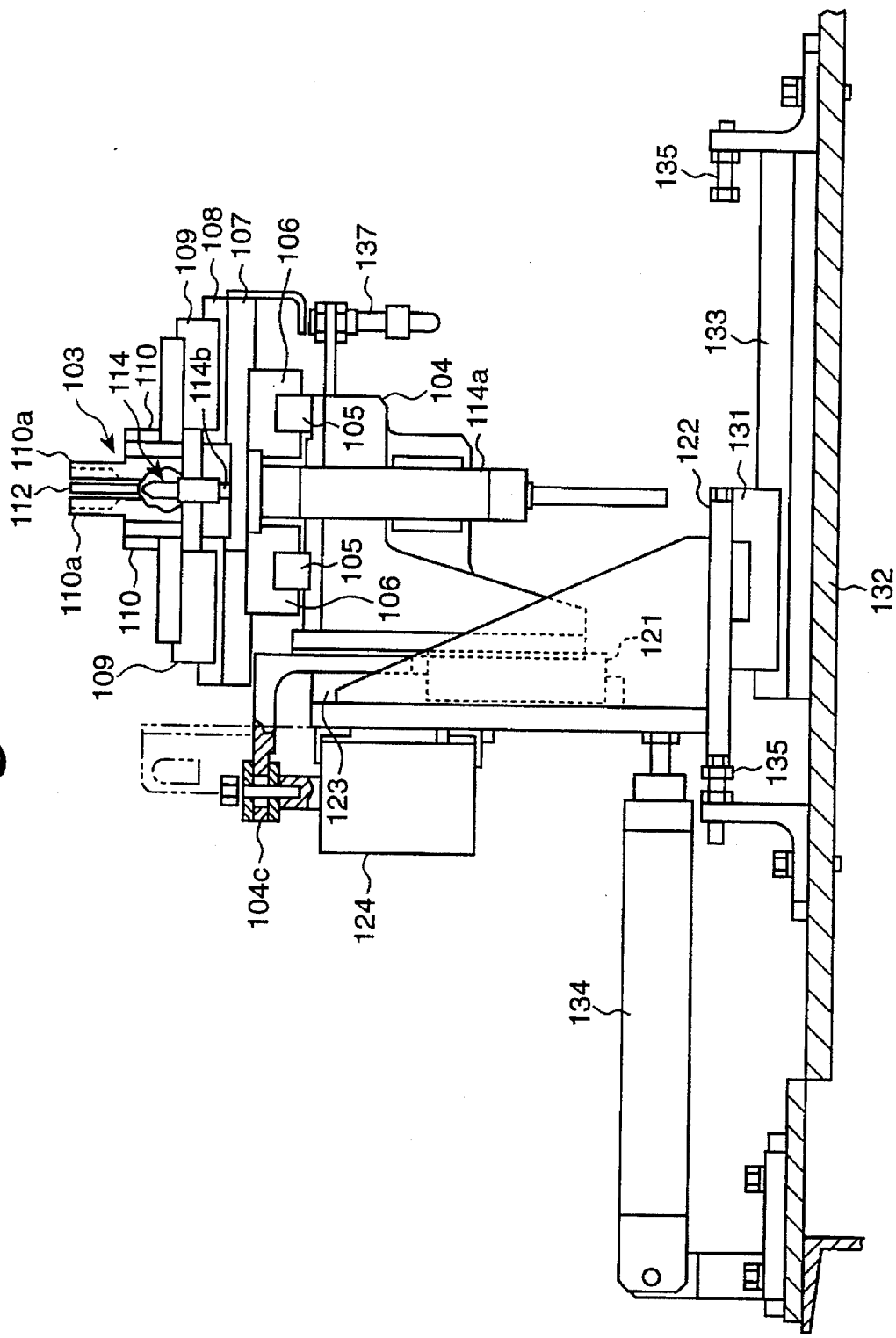
FIG. 16 is a front view of a nut feeder apparatus.
Figure 17:
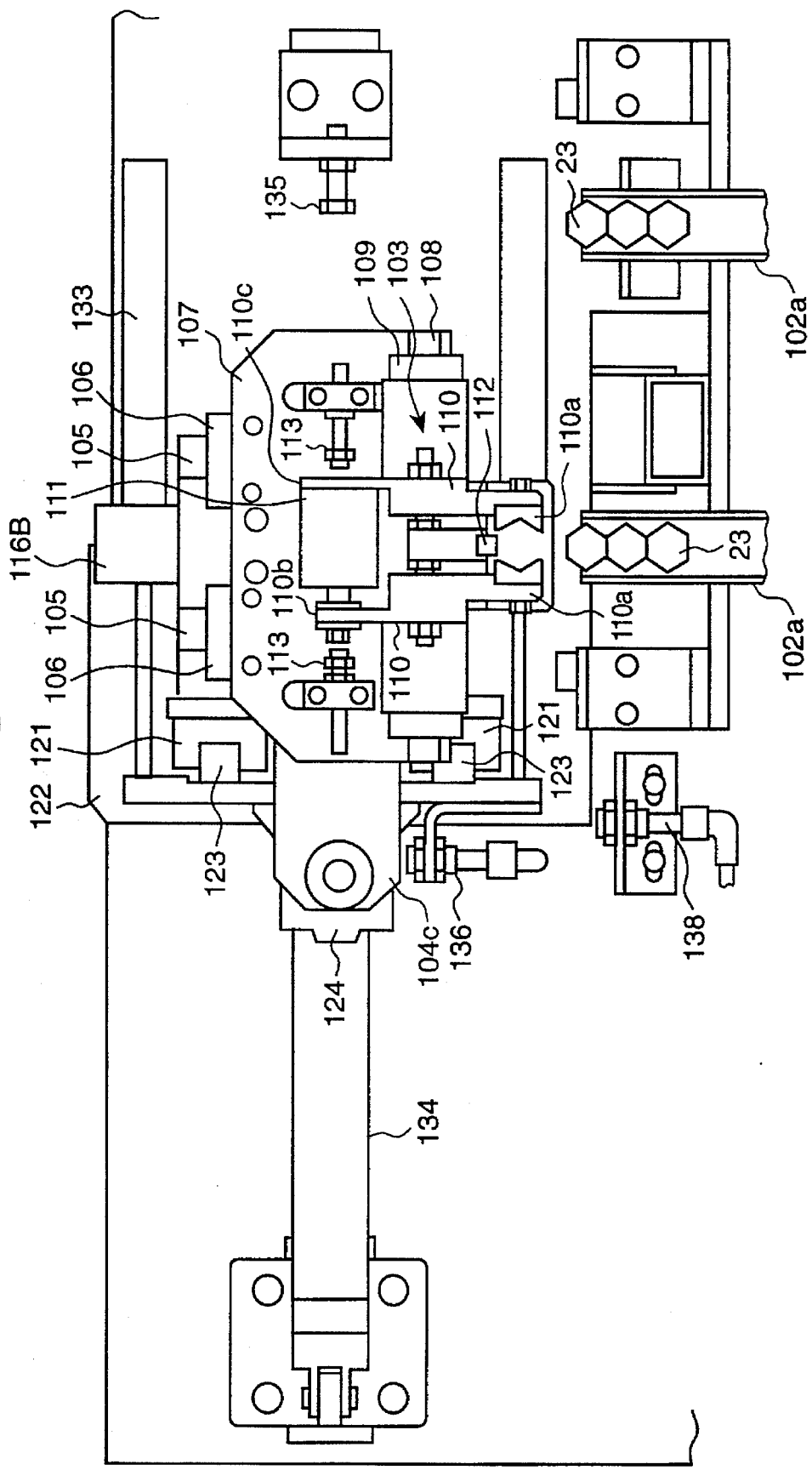
FIG. 17 is a plan view of the nut feeder apparatus.
Figure 18:
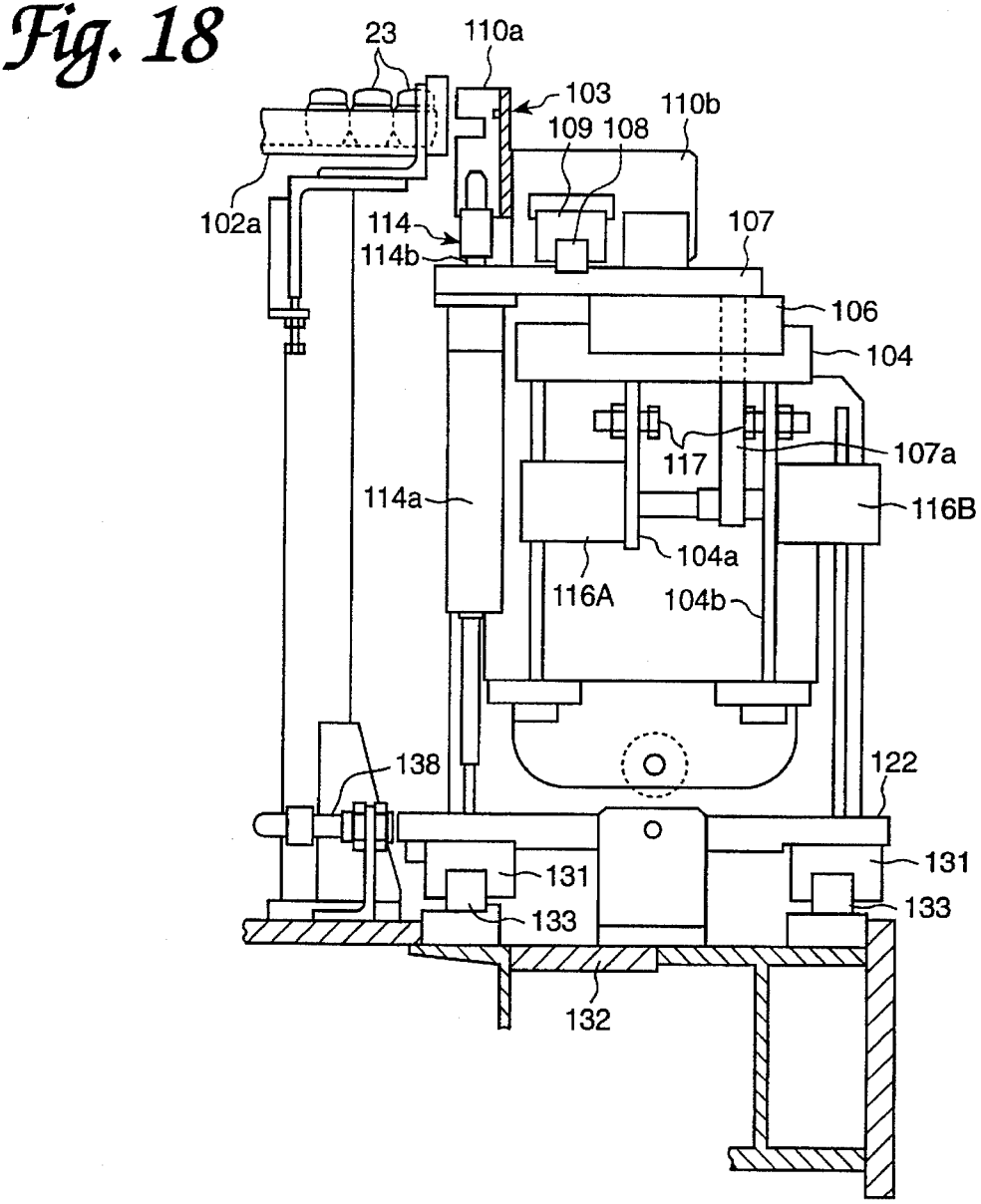
FIG. 18 is a side view of the nut feeder apparatus.
Figure 19:
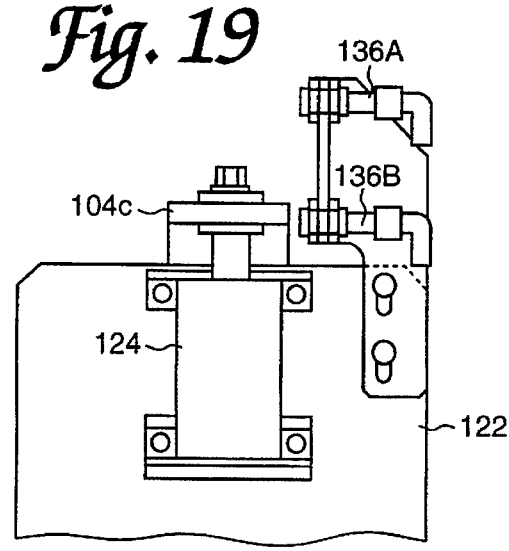
FIG. 19 is a side view of an essential part of the nut feeder apparatus.

Referring to FIGS. 5 to 8, the center pin attachment 4, to which different types of hollow center pins 7A, 7B and 7C are interchangeably and detachably mounted according to different types of wheels W, has a center pin socket 11 and a cylinder 12. The center pin socket 11 receives the upper end portion of each hollow center pin 7. The cylinder 12, which is secured to the center pin socket 11 by means of a bracket 12b, has a piston 12a engageable with and disengageable from a groove 7a of the hollow center pin 7. A link rod 13, which is secured at its lower end to the center pin socket 11, links at its tapered cone end 13a with a slider member 16 moveable up and down with respect to a base structure 15. The slider member 16 is formed with a bore 16a engaged by a distal end of a rocker arm 14 pivoted at its middle portion on a bracket 17A secured to the base structure 15 so as to be forced up and down as a result of pivotal movement of the pivoted arm 16. A cylinder 18 is connected to and between the distal end of the rocker arm 14 and a bracket 17B secured to the base structure 15 so as to cause the pivotal movement of the pivot arm 16. A switch 19, such as a photocoupler sensor, is supported by the bracket 17A through a securing member 20 and detects the pivotal movement of the pivoted arm 16. Above the piston 12a of the cylinder 12, there is provided a spherical thrust bearing 12 configured to bear the spherically shaped upper end 11a of the center pin socket 11. As clearly seen in FIG. 6 showing the center pin attachment 4 in which the slider member 16 is in its down position, the link rod 13 is in engagement with the slider member 16 through the engagement between the tapered cone end 13a of link rod 13 and the tapered bore formed in the lower end of the slider member 16 so as to link the slider member 16 with the center pin socket 11 together.

A specific type of the hollow center pin 7, which is held by the center pin stocker 41 which will be described later so as to be movable in two dimensions, is supplied according to a specific type of the wheel W and fitted to the center pin socket 11 of the center pin attachment 4. Specifically, the cylinder 18 is activated to turn the rocker arm 14 in the counterclockwise direction as viewed in FIGS. 5 and 6 so as to force the slider member 16 upward, thereby disengaging and separating apart the slider member 16 from the link rod 13. This permits the center pin socket 11 to turn in two dimensions around the spherical bearing 12c. This two dimensional relative movement between the socket 11 and the hollow center pin 7 makes it quite easy to fit or attach the hollow center pin 7 to the socket 11 of center pin attachment 4 in spite of any supplied position of the hollow center pin 7 with respect to the socket 11.

A screw device 21 in cooperation with each of the nut runner 5 is driven by the nut runner 5 so as to screw a nut 23 on a hub bolt 22 which has been provisionally affixed to an axle hub H1 of the vehicle body 1, thereby fitting and securing the wheel W to the vehicle body 1.

The wheel hold device 6, which is disposed on each diametrically opposite side of the wheel W and basically mounted on the base structure 15, has first and second positioning members 31 and 34. The first positioning member 31 is in cooperation with a cylinder 32 so as to be moved close to and away from the wheel W in a radial direction of the wheel W. The second positioning member 34, which is provided with an elastic gripping pad 33 and mounted for up and down movement on the first positioning member 31, is in cooperation with a cylinder 35 to be moved in a direction perpendicular to the radial direction in which the first positioning member 31 moves. The wheel hold devices 6 move the first and second positioning members 31 and 34 so as to regulate the gripping pads 33 in position according to the diameter and width of the specific wheel W, thereby gripping the wheel W stably. The first positioning member 31 is mounted for slide movement on first and second guide members 36a and 36b secured to the base structure 15. Similarly, the second positioning member 34 is mounted for slide movement on first and second guide members 37a and 37b secured to the first positioning member 31.

Referring to FIGS. 8 to 11 in conjunction with FIG. 1, the center pin stocker 41 for supplying various types of hollow center pins 7 which are basically identical in shape but different in size (for instance, three types of center pins 7A, 7B and 7C in this embodiment), is disposed at a location in close proximity to an intersection between a wheel conveyor 42 for conveying a wheel W to a wheel transfer position near the wheel assembling station P1 and a pallet conveyor 44 for conveying a nut pallet 43 to a nut transfer position near the wheel assembling station P1. The nut pallet 43 carries as many hub nuts 32 as necessary to assemble the wheel W to the axle. The center pin stocker 41 is secured on a double walled slide table 48 mounted for two dimensional slide movement in a horizontal plane on a stationary table 47 secured to a stand 46 extending vertically from the base floor 45. The slide table 48 is provided with a plurality of hollow pin stands 50 (50A, 50B and 50C), vertically extending therefrom and arranged in a straight line, on which the hollow center pins 7 (7A, 7B and 7C) are externally mounted, respectively. The slide table 48 is further provided with retainer arms 51 pivoted on the pivot shafts 52 secured to the slide table 48 between top and bottom walls 48b and 48c and extending passing through the top wall 48b into the inside of the respective hollow pin stands 50. Each retainer arm 51 is formed with a hooked upper end 51a extending to the exterior of the hollow pin stand 50 through a hole 50a so as to be engageable with an internal groove 7b of hollow center pin 7 extending in an lengthwise direction. By means of the engagement between the hollow center pin 7 and the retainer arm 51, the hollow center pin 7 is safely retained on the stocker 41. The retainer arms 51 are pivoted at their lower ends on an actuator rod 53 guided between the top and bottom walls 48b and 48c of slide table 48. This actuator rod 53 is connected at its one end to a cylinder 54 secured to an end wall 48a so as to be reciprocally moved. The reciprocal movement of the actuator rod 53 causes the retainer arms 51 to turn so as to be brought into and out of engagement with the hollow center pins 7.

Installed between the stationary table 47 and the slide table 48 is a floating mechanism for allowing the slide table to move in two dimensions in a horizontal plane with respect to the stationary table 47. The floating mechanism includes a pair of parallel guide rails 55 secured to the stationary table 47 and a single slide rail 57 secured to the bottom wall 48c of slide table 48 and extending perpendicularly to the parallel guide rails. A pair of floating sliders 56, on one hand, are mounted for slide movement on the parallel guide rails 55 and, on the other hand, mount the slide rail 57 for slide movement thereon. For stable slide movement of the slide table 48, there are provided balancing springs 58 between the stationary table 47 and the sliders 56 and balancing springs 59 between the stationary table 47 and the slide rails 57. In close proximity to the respective pin stands 50A, 50B and 50C there are switches 60A, 60B and 60C for detecting engagement and disengagement between the center pins 7A, 7B and 7C and the pin stands 50A, 50B and 50C, respectively.

Referring to FIGS. 12 to 15 showing the position guarantee device 61 for controlled position verification of the robot hand 2b of the wheel assembling apparatus 2, the position guarantee apparatus 61 includes a stationary table 62 and a slide table 63 supported for two dimensional slide movement by the stationary table 62. The stationary table 62 is fixedly provided with handles 64 on opposite sides thereof and a cylindrical hollow boss 65 extending from the center thereof. The slide table 63 is fixedly provided at its center with a hollow cylindrical bush 66 extending inside and movable within the cylindrical hollow boss 65. A joining rod 67 is fitted in the cylindrical hollow boss 65 so as to move axially within the cylindrical bush 66 but prevented from rotating within the cylindrical bush 66 by means of ball and spline engagement between them. This joining rod 67 is provided at its one end with a tie mount 93 detachably fixed thereto by means of a flange disk 69 on which the center pin socket 11 of the center pin attachment 4 of robot hand 2 is detachably mounted. Further, it is integrally provided at its other end with a tie jaw 68 directly engageable with a master work table 92 which will be described later. Between the flange disk 69 and the slide table 63 there is provided a spring 70.

The slide table 63 is provided with a pair of sliders 82 fixedly secured thereto by means of a pair of rods 81, respectively. These sliders 82 are supported for slide movement by a pair of guide members 83 secured to the stationary table 62. Each of the guide member 83 is fixedly provided with a slider 84. The slider 84 is mounted for slide movement on each of a pair of guide rails 85 secured to the stationary table 62 and extending perpendicularly to the rods 81. Either one of the rods 81 is fixedly provided with an extension 86 and urged in a direction perpendicular to a direction in which it extends or in parallel with a direction in which the guide rails extend by a pair of springs 87 disposed between the one rod 81 and the stationary table 62. The stationary table 62 is fixedly provided with a generally L-shaped bracket 88 for supporting and positioning a pair of dial gauges 89 and 90 whose dial buttons 899 and 90a are oriented perpendicularly to each other and placed against the extension 86. Further, the stationary table 62 is loaded with a balancing weight 91 which is adjusted in weight according to wheel types.

The master work table 92, on which a master work 61 is placed, is provided at its center with a reference means 92a for providing a work origin which is engageable with the tie jaw 68 of the joining rod 67 of master work 61. When properly positioning the master work 61 upside down on the master work table 92 so as to engage the tie jaw 68 of the master work 61 with the reference means 92a, both the dial gauges 89 and 90 indicate zero points. Accordingly, any amount of two dimensional movement or displacement of the slide table 63 with respect to the stationary table 62, which is possibly caused when the center pin socket 11 of the center pin attachment 4 of robot hand 2 is mounted on the tie mount 93, causes the dial needles of the dial gauges 89 and 90 to move and indicate components of the two dimensional displacement. The relative position of the wheel hub W1 with respect to the wheel assembling apparatus 2 is found by, after having removed the master work 61 from the master work table 92 and fitted it to the robot hand 2b by engaging the tie Jaw 68 with the center pin socket 11 of robot hand 2b, engaging the hub bolts 22 affixed to the wheel hub W1 with the flange disk 69 of the master work 61. The peripheral flange 69a of flange disk 69 is formed with bolt holes attached with bushes 71 which are engaged with the hub bolts 22 affixed to the wheel hub W1.

Referring to FIGS. 16 to 19 in conjunction with FIG. 1 showing a nut feeder apparatus 101 for feeding the nuts 23, the nut feeder apparatus 101 includes two nut feeders 102, a nut setting apparatus 141 and a pallet conveyor 44. The nut setting apparatus 141 cooperates with a nut holder 103 and a nut lifter 114 so that it receives and holds a nut 23 at an angle at which the nut 23 is fitted to the wheel hub W1 and shifts the nut 23. The nuts 23 are transferred to and placed on the nut pallet 43 on the pallet conveyor 44 by the nut setting apparatus 141, and then transferred toward the wheel transfer position by the pallet conveyor 44. Each of the nut feeders 102 feeds the nuts 23 through feeder paths 102a. The nut holder 103 includes a slide table 107 and a gripping hand 110 with fingers 110b and 110c. This slide table 107 is provided with a pair of sliders 106 and a guide rail 108, extending perpendicularly to the sliders 106, which are secured to under and top surface of the slide table 107, respectively. The sliders 106 are, respectively, mounted for slide movement on a pair of guide rails 105 secured to a lift 104 so that the slide table 107 moves on the lift 107 in one direction. On the other hand, the guide rail 108 mounts a pair of sliders 109 of the nut gripping hand 110 with gripping fingers 110b and 110c thereon so that the nut gripping hand 110 moves on the slide table 107 in a direction perpendicular to the direction in which the sliders 106 moves. The nut gripping hand 110 includes a cylinder 111 which is supported between the fingers 110b and 110c and is actuated to open and close the fingers 110b and 110c so as to grip the nut 23 supplied from the nut feeder 102. Disposed between gripping pads 110a of the fingers 110b and 110c on the slide table 107 is a stopper 112 for locating the nut 23 in a proper position between the gripping pads 110a. In addition, there are provided on the slide table 107 stoppers 113 for preventing the respective fingers 110b and 110c from being opened in excess. The nut lifter 114, positioned below the nut holder 103, includes a cylinder 114a for moving up and down a lifter rod 114b. When the cylinder 114a is activated, the lifter rod 114b is forced upward to push up the nut 23 gripped with the gripping pads 110a toward a nut holding hand 142 of the nut setting apparatus 141. The nut holding hand 142 includes a magnetic nut holder 142a having a magnet 144 for attracting and holding the nut 23.

The slide table 107 is connected to a pair of cylinders 116A and 116B secured, respectively, to extensions 104a and 104b, extending vertically downward from the lift 104, by means of a connecting extension 107a extending vertically downward from the slide table 107 so as to be moved horizontally between limiters 117. The lift 104 is provided with a slider 121 secured thereto which is mounted for vertical slide movement on a guide rail 123 extending vertically from a slide table 122. The lift 104 is moved up and down by means of a cylinder 124 which is secured to the guide rail 123 and having a piston which is connected to a tail end 104c of the lift 104. This slide table 122 is provided with a slider 131 secured thereto and mounted for horizontal slide movement on a guide rail 133 secured to a stationary base table 132. A cylinder 134 links these slide tables 122 and 132 so as to cause the slide movement of the slide table 122 with respect to the base table 132 between limiters 135. In connection with the nut feeder apparatus 101 there are provided switches 136A, 136B, 137 and 138 for detecting the lift 104, the slide table 107 and the slide table 122 in their specified positions.

Figure 20:
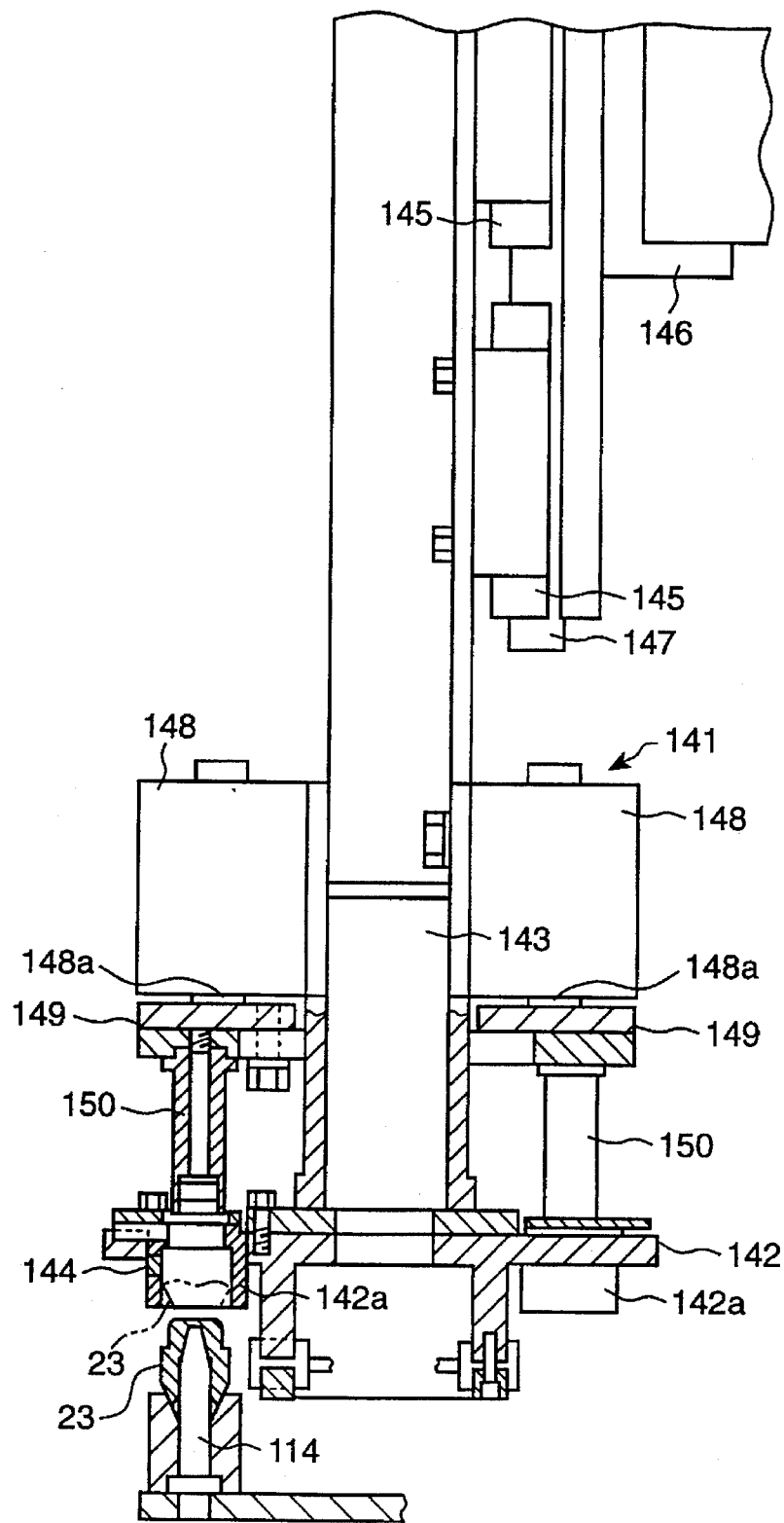
FIG. 20 is a sectional view of an essential part of a nut setting apparatus.
Figure 21:
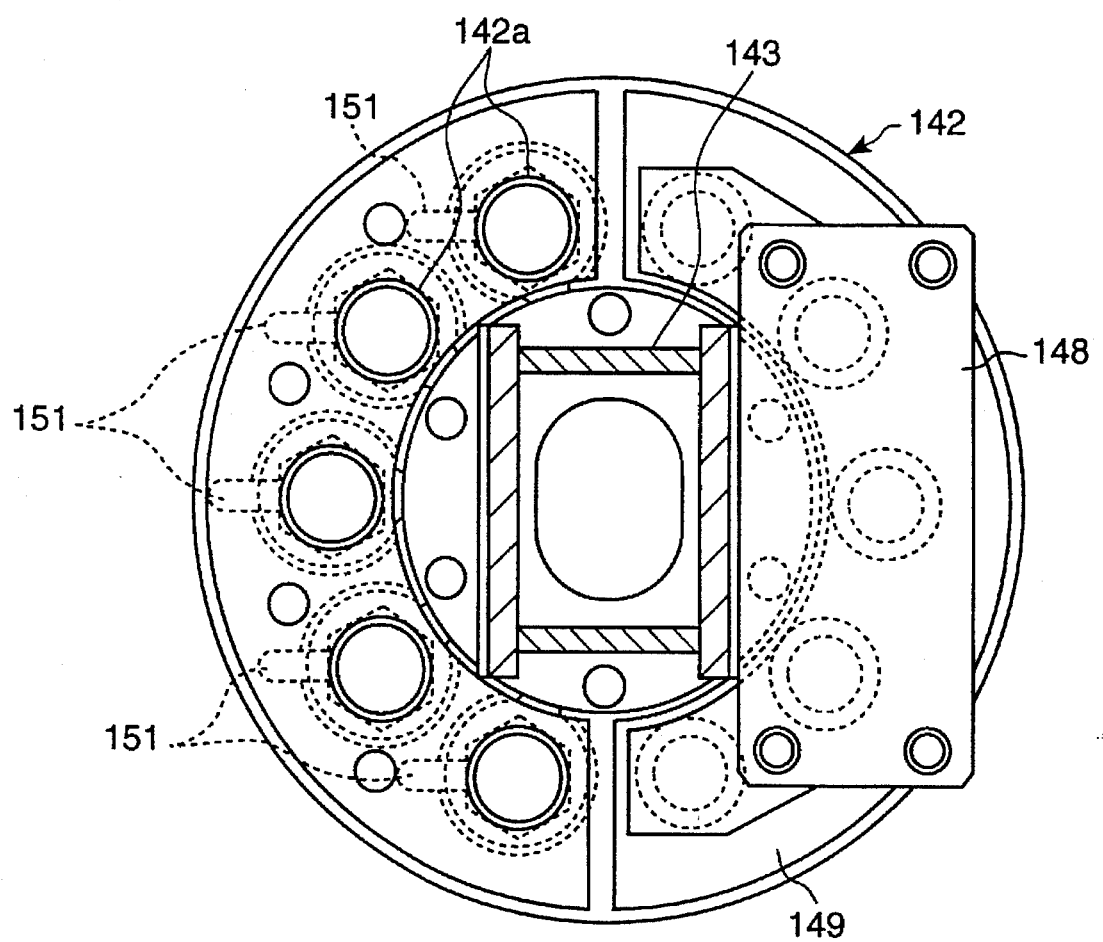
FIG. 21 is a bottom view, partially sectional, of the essential part of the nut setting apparatus.

Referring to FIGS. 20 and 21, showing the nut setting apparatus 141, a nut holding table 142, which is constructed so as to move in two dimensions in a horizontal plane and to which a lower end of a lift rod 143 is secured, has a plurality of magnetic nut holders 142a arranged at regular circumferential separations. This nut holding table 142 can move in two dimensions to position any one of the magnetic nut holders 142a right above the nut lifter 114 so as to attract the nut 23 with the magnet 144. The lift rod 143 is provided with a pair of sliders 145 secured thereto and mounted on a vertical guide rails 147 secured to a stationary part 146. Further, there are provided a pair of actuators 148. Each of the actuators 148 has a plunger rod 148a with a semicircular-arcuate plate 149. The semicircular-arcuate plate 149 has a plurality of push rods 150 which extend downward from the plate 159 and are arranged at the same regular circumferential separations as those at which the magnetic nut holders 142a of the nut holding table 142 are arranged. When the actuator 148 is actuated to protrude the plunger rod 148a downward, the push rods 150 push and release the nut 23 from the magnetic nut holders 142a, allowing the nuts 23 to fall down on the pallet 43. The nut 23 is detected by a switch 151 provided in connection with each magnetic nut holder 142a when it is attracted within the magnetic nut holder 142a. The pallet 43 is configured to receive four sets of the nuts 23 for four wheels of a vehicle.

With the wheel assembling apparatus in accordance with the present invention, a number of the nuts 23 placed on the pallet 43, which are necessary to assemble a wheel W to the vehicle body, are transferred by means of the pallet conveyor 44 of the nut feeder apparatus 101 and picked up by the wheel assembling apparatus 2, and the wheel W transferred by the wheel conveyor 42 is subsequently gripped by the wheel hold device 6 of the robot hand 2b of wheel assembling apparatus 2. The wheel assembling apparatus 2 operates so as to bring the wheel W and nuts 23 to the position where the wheel W is fitted to the axle hub of the vehicle body 1 and which is monitored by means of the monitor 3. Thereafter, the wheel assembling apparatus 2 drives the nut runners 5 to turn the screw devices 21 so as to screw and fasten the nuts 23 to the hub bolts 22 provisionally affixed to the wheel W, thereby assembling the wheel to the vehicle body 1.

As is clearly seen in FIG. 6, showing the center pin attachment 4 of the robot hand 2b, during the wheel assembling operation by the wheel assembling apparatus 2, the cylinder 18 is actuated to cause pivotal movement of the rocker arm 14 so as to move the slider member 16 upward, bringing the slider member 16 out of disengagement with the tapered cone end 13a of link rod 13. This permits the center pin socket 11 to turn in two dimensions around the spherical bearing 12c. Then, the wheel assembling apparatus 2 brings the center pin socket 11 into engagement with the selected center pin 7, which is either one of the center pins 7A to 7C mounted on the pin stands 50 (50A, 50B and 50C) on the slide table 48, respectively, and subsequently causes the cylinder 12 to bring the piston 12a into engagement with the groove 7a of the center pin 7. The cylinder 54, secured to the slide table 48, is actuated to force the actuator rod 53 so as to turn the retainer arms 51 and bring them out of engagement with the center pins 7. Thereafter, the wheel assembling apparatus 2 moves the robot hand 2b so as to bring the nuts 23 and the wheel W to the wheel axle of the vehicle body 1.

As described above, because the wheel assembling apparatus 2 has the center pin attachment 4 to which any one of the different types of center pins 7A–7C, provisionally mounted on the pin stands 50A–50C of the stocker 41, is selectively attached according to the types of wheels W, it positions exactly any type of wheel W with respect to the wheel axle of the vehicle body 1. In order to interchange the different types of center pins 7A–7C, the center pins 7, now attached to center pin attachment 4, is returned to the stocker 41 and mounted on either one of the pin stands 50A–50C on which none of the center pins 7 are mounted. Then, the cylinder 12 is actuated so as to bring the piston 12a out of engagement with the groove 7a of the center pin 7, thereby dismounting the center pin 7 from the socket 11 of center pin attachment 4. Thereafter, another type of center pin 7 is selected and mounted on the socket 11 of center pin attachment 4 in the same manner as described above.

It is to be understood that although the present invention has been described with regard to preferred embodiments thereof, various other embodiments and variants may occur to those skilled in the art. Any such other embodiments and variants which are within the scope and spirit of the invention are intended to be covered by the following claims.

What is claimed is:

1. A wheel assembling apparatus for assembling different types of wheels to different types of vehicle bodies conveyed along a vehicle assembling line, each wheel of said wheels having a wheel hub formed with a center hole specific in dimensions according to its wheel type, said wheel assembling apparatus comprising:

a wheel assembling robot having a hand, for assembling a wheel held by said hand, to a vehicle body by fastening a plurality of nuts to hub bolts provisionally affixed to said wheel;

a plurality of different types of center pins prepared so as to correspond to said center holes of said wheels, each of said center pins being fitted into a center hole of said wheel hub for positioning said wheel with respect to said wheel assembling robot; and a center pin attachment, secured to said hand, to which said different types of center pins are selectively and detachably attached.

2. A wheel assembling apparatus as defined in claim 1, and further comprising a center pin support device cooperating with said wheel assembling robot for providing said different types of center pins.

3. A wheel assembling apparatus as defined in claim 2, wherein said center pin support device includes a table, movable in perpendicularly intersecting directions in a horizontal plane and on which said different types of center pins are supported so as to be movable in one of said directions.

4. A wheel assembling apparatus as defined in claim 3, wherein said center pin support device further includes a plurality of center pin stands, disposed on said table, for mounting said different types of center pins thereon and means, cooperating with each of said center pin stands, for providing engagement and disengagement of each center pin with one of said center pin stands.

5. A wheel assembling apparatus as defined in claim 1, wherein said center pin attachment includes a socket for receiving any one of said different types of center pins and a spherical bearing for supporting said socket for two dimensional movement with respect to said center pin attachment.

6. A wheel assembling apparatus as defined in claim 5, wherein said center pin attachment further includes locking means for locking said socket with respect to said center pin attachment during assembling of said wheel to said vehicle body.

7. A wheel assembling apparatus as defined in claim 1, wherein said wheel assembling robot includes a plurality of nut runners arranged around said center pin attachment for fastening said nuts to said hub bolts affixed to said wheel.

8. A wheel assembling apparatus as defined in claim 1, wherein said hand includes fingers adaptable to grip said different types of wheels therebetween.

9. A wheel assembling apparatus as defined in claim 8, wherein each said finger comprises a first member which is movable in one direction so as to regulate a distance between said fingers and a second member secured to said first member which is movable in another direction perpendicular to said one direction.

10. A wheel assembling apparatus for assembling different types of wheels to different types of vehicle bodies in a vehicle assembling line, each wheel of said wheels having a wheel hub formed with a center hole specific in dimension according to its wheel type, said wheel assembling apparatus comprising:

a robot hand for fastening a plurality of nuts to hub bolts provisionally affixed to a wheel so as to assemble said wheel, which is held by said robot hand, to a vehicle body; and a center pin attachment, secured to said robot hand, to which a plurality of different types of center pins, prepared so as to correspond to center holes of said wheels, are selectively and detachably attached according to said different types of wheels, each of said center pins positioning said wheel with respect to said robot hand.

11. A method of assembling different types of wheels to different types of vehicle bodies conveyed along a vehicle assembling line by fastening a plurality of nuts to hub bolts provisionally affixed to a wheel hub by a robot hand, said wheel hub being formed with a center hole specific in dimension according to its wheel type, said method comprising the steps of:

providing a plurality of different types of center pins prepared so as to correspond to center holes of said different types of wheels;

causing said robot hand to attach one of said different types of center pins thereto;

causing said robot hand to grip a wheel having a wheel hub which has a center hole corresponding to said one of said center pins and to engage said one of said center pins with the center hole of the wheel gripped by said robot hand; and fastening one of said nuts to one of said hub bolts so as to assemble said wheel gripped by said robot hand to one of said vehicle bodies.

12. An assembling apparatus for assembling different types of vehicle elements to different types of subject bodies conveyed along a vehicle assembling line, each of said vehicle elements having a hole specific in dimensions according to its type and each of said subject bodies provided with at least one engaging stud, said assembling apparatus comprising:

an assembling robot having a robot hand for assembling a vehicle element held by said robot hand to a subject body by engaging fastening means to said at least one engaging stud of one of said subject bodies so as to assemble said vehicle element to said one of said subject bodies;

different types of positioning members having external shapes in conformity with the holes of said different types of vehicle elements, respectively, a specific type of positioning member being able to be fitted in the hole of one vehicle element of a specific type for positioning said one vehicle element with respect to said robot hand; and an attachment, secured to said robot hand, to which said different types of positioning members are selectively and detachably attached.

13. An assembling apparatus as defined in claim 12, and further comprising a support device cooperating with said assembling robot and including a table which is movable in perpendicularly intersecting directions in a horizontal plane and on which said different types of positioning members are supported so as to be movable in one of said directions.

14. An assembling apparatus as defined in claim 12, wherein said attachment includes a socket for receiving any one of said positioning members, said socket being supported by and movable with respect to said attachment.

15. An assembling apparatus as defined in claim 14, wherein said socket is locked after receiving said positioning member.

* * * * *